April 1, 1952     R. A. NEITZKE     2,591,186
TRUCK BOX COVER

Filed May 17, 1950     3 Sheets-Sheet 1

Raymond A. Neitzke
INVENTOR.

BY *Clarence A. O'Brien*
and *Harvey B. Jacobson*
Attorneys

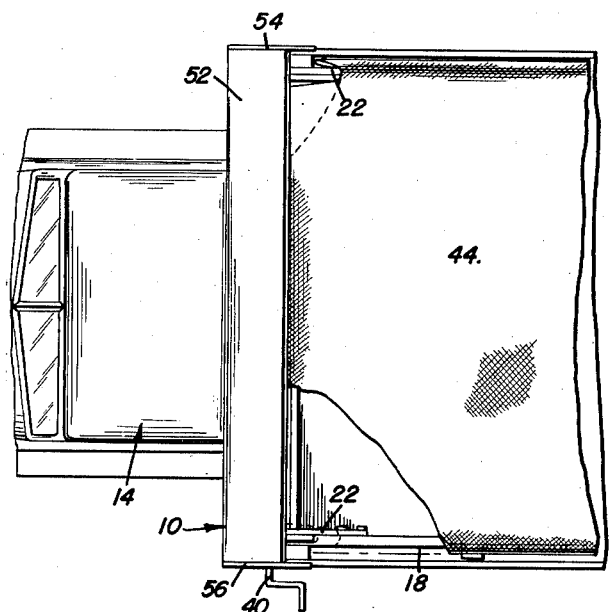
Fig. 4
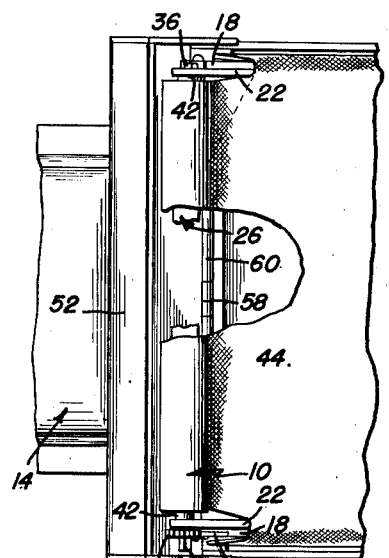
Fig. 5
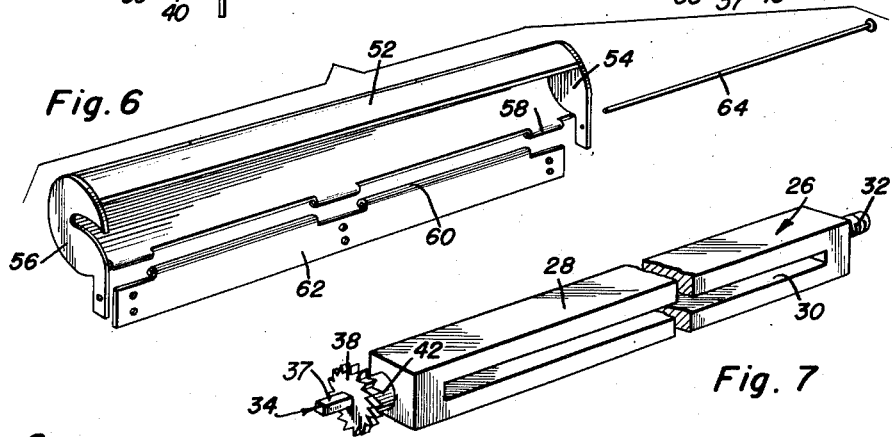
Fig. 6
Fig. 7
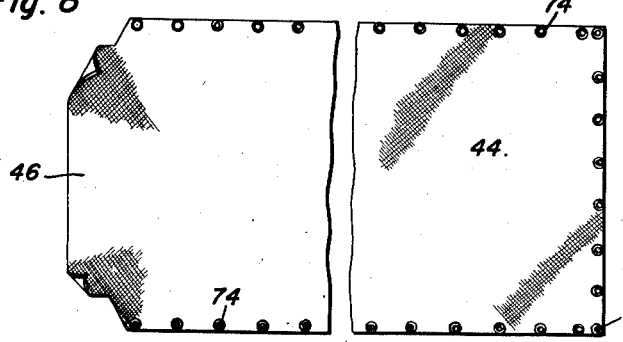
Fig. 8
Raymond A. Neitzke
INVENTOR.

April 1, 1952 R. A. NEITZKE 2,591,186
TRUCK BOX COVER
Filed May 17, 1950 3 Sheets-Sheet 3
Fig. 9
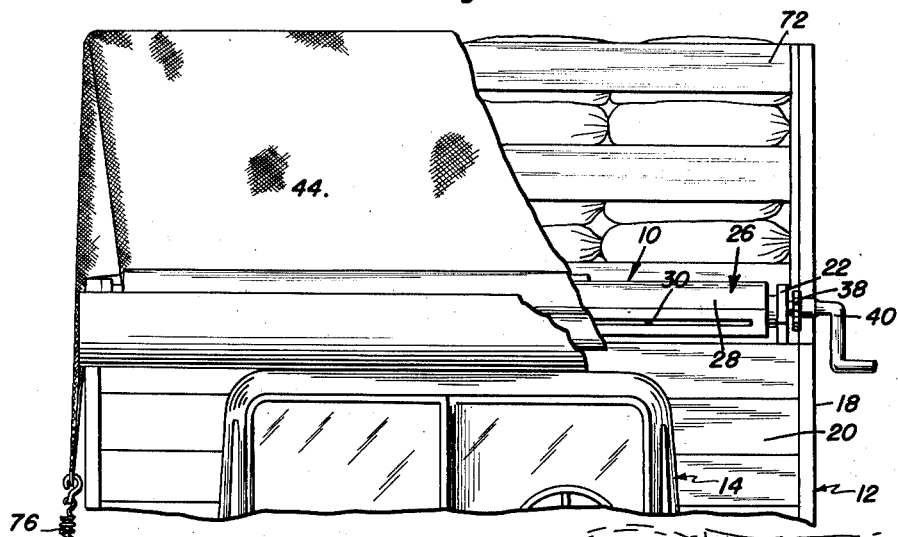
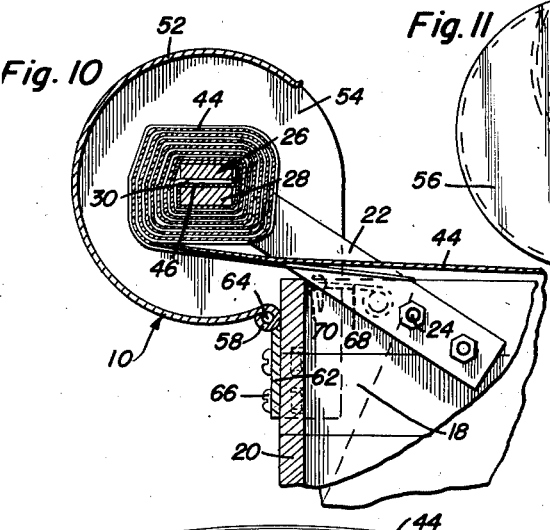
Fig. 10
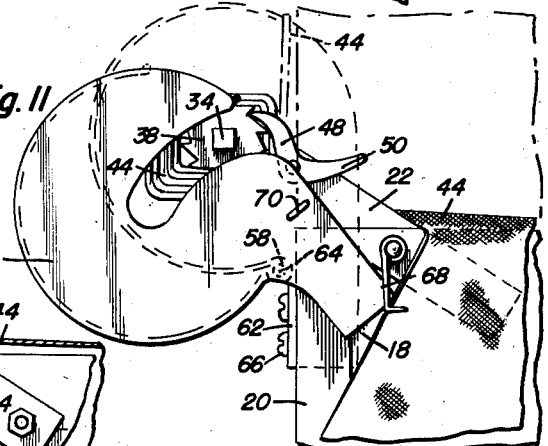
Fig. 11
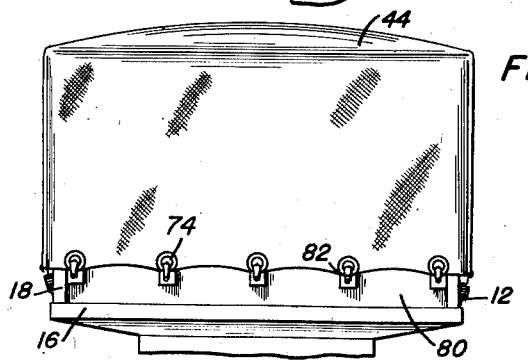
Fig. 12
Raymond A. Neitzke
INVENTOR.

Patented Apr. 1, 1952

2,591,186

UNITED STATES PATENT OFFICE 2,591,186

TRUCK BOX COVER

Raymond A. Neitzke, Estherville, Iowa

Application May 17, 1950, Serial No. 162,482

2 Claims. (Cl. 296—98)

This invention comprises novel and useful improvements in truck box covers, and more particularly pertains to a web-type cover, with a device for selectively rolling and unrolling the web.

An important object of this invention is to provide a device which may be positioned on the truck box, which device will store the web when the latter is not in use.

Another object of this invention is to provide a device, in accordance with the foregoing object, which device will retain the forward or leading edge of the web firmly on the front of the truck box.

A further object of this invention is to provide a device, in accordance with the foregoing object, which device can be actuated to tension a web which is otherwise secured at the rear end of the truck box, thereby forming a taut cover for the box.

Still another object of this invention is to provide a device, in accordance with the foregoing object, which is so mounted upon the truck box that it will not interfere with the placement of an upper deck on the box, and which can be utilized to either cover the truck box itself, or, alternatively be utilized to cover the upper box when the latter is positioned on the truck box.

Yet another object of this invention is to provide a casing for the roll of web covering material, which will encase the roll, and which will also restrict the entrance of wind and rain and the like between the forward or leading edge of the web and the upper edge of the front wall of the truck box.

An important feature of this invention resides in the provision of a pair of brackets mounted upon the side walls of a truck box, which brackets extend forwardly of the truck box, and which rotatably support a web receiving arbor forwardly of said box, in such a manner as not to interfere with the placement of a second box or deck upon the truck box.

Another feature of this invention resides in the provision of a truck box covering device, in accordance with the foregoing feature, together with a casing which is secured to the forward wall of the truck box, and which encases the web receiving arbor, to protect the web when the latter is rolled thereon, and which also forms a shield against the entrance of wind or rain or the like between the web and the upper edge of the forward wall of the truck box.

Still another feature of this invention resides in the provision of a truck box covering and casing therefor, in accordance with the foregoing feature, which casing is pivotally secured to the forward wall of the truck box, in such a manner as to permit a web to be unwound from the arbor, to either cover the top of the truck box, or to alternatively cover the top of an upper deck superimposed upon the truck box.

These, together with various ancillary features and objects, are attained by this device, the preferred embodiment of which has been illustrated, by way of example only, in the accompanying drawings, wherein:

Figure 4 is a fragmentary top plan view of a truck box having the web storing device mounted upon the forward end thereof, the web casing shown covering the unwound portion of the roll of web;

Figure 5 is a fragmentary top plan view of a truck box having the web storing device mounted thereon, the hingedly mounted casing being pivoted back, parts being broken away to show details of construction;

Figure 6 is a perspective elevational assembly view of the casing for the web storing device;

Figure 7 is a perspective elevational view of the web receiving arbor;

Figure 8 is a fragmentary top plan view of the web;

Figure 9 is a fragmentary front elevational view of a truck having a truck box, an upper deck superimposed thereon, the web overlying and covering the upper deck;

Figure 10 is a fragmentary transverse sectional view of the web storing device;

Figure 11 is an end elevational view of the web storing device, the dotted line construction showing the casing in its roll encasing position; and Figure 12 is a rear elevational view of a truck box, having the web covering the same, the rear end of the web being secured to the rear end of the truck box.

Because of the problem incident to the loading and unloading of trucks which are merely provided entrances at the sides or rear portions of the box thereof, it is highly desirable to utilize trucks having open-top boxes thereon which not only permit loading from the top thereof, but which also permit loads to be stacked above the sides of the truck box. However, it is also necessary to protect the contents of the truck box from rain and the like, and accordingly tarpaulins are generally detachably secured to the truck box so as to permit removal thereof when the boxes are being loaded, or when it is otherwise not necessary to have the tarpaulins thereon. Because of the expense of the tarpaulins, it is desirable to expose the latter to the wind and sun, which will cause deterioration thereof, only when necessary to protect the truck's contents. The applicant, accordingly, has devised an improved device for the storage of the tarpaulin, when not in use, and which device will also assist in the mounting of the tarpaulin on the truck box, whereby the tarpaulin will be protected when the latter is stored on the device, and which storage device is readily actuatable to permit the tarpaulin to be spread over the box, so as to shield the contents thereof from rain and the like.

Figure 1:
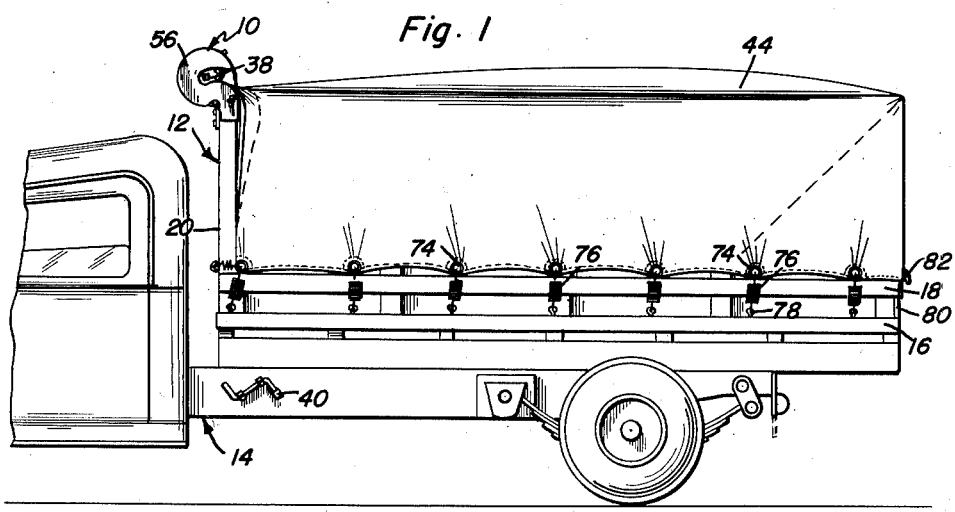
Figure 1 is a fragmentary side elevational view of a truck having a box thereon, the web shown covering the box, and the web storing device shown positioned on the forward end thereof.
Figure 2:
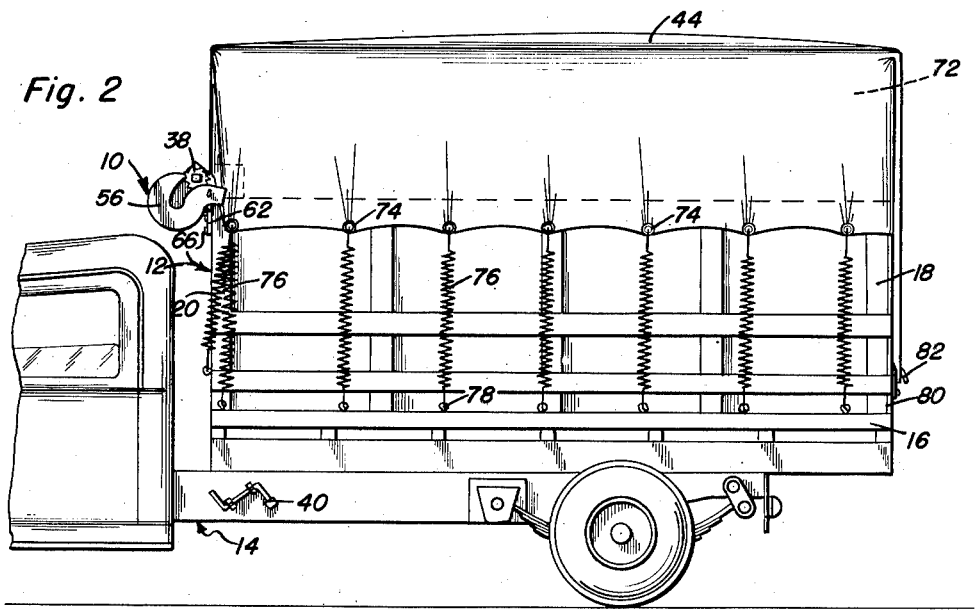
Figure 2 is a fragmentary side elevational view of the truck box, with a second deck superimposed thereon, the web covering the upper deck.
Figure 3:
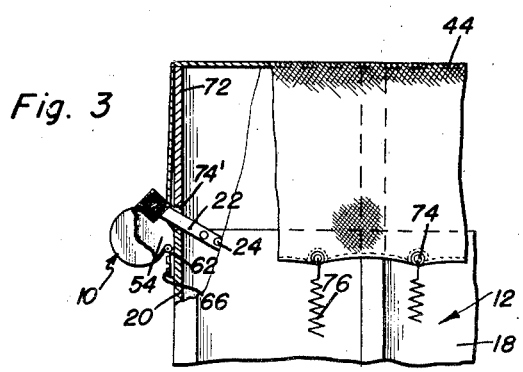
Figure 3 is a fragmentary side elevational view of the truck having the upper deck superimposed thereon, parts being broken away and shown in section to illustrate the manner in which the web storing device is mounted upon the truck body.

Referring now more specifically to the accompanying drawings, wherein like numerals designate similar parts throughout the various views, it will be seen, by reference to Figures 1, 2 and 9, that there is provided a tarpaulin storage device indicated generally by the numeral 10 which is adapted to be mounted adjacent the forward end of a truck box 12 which is carried by a truck indicated generally by the numeral 14.

The truck box 12 includes, generally, a platform 16 to which are attached the upwardly extending side walls 18 and front wall 20. Front and side walls 20 and 18, respectively, may be of the conventional rack construction or, alternatively, may be of a solid wall type of construction.

The tarpaulin or web storing device 10 consists generally of a pair of brackets 22 which are secured, preferably to the inner surface of the side walls 18 by means of fastening bolts 24, and which brackets extend forwardly of the front wall 20, for a reason which will later become apparent as the following description proceeds. A web receiving arbor 26 is rotatably journaled between the brackets 22, the arbor including a central, preferably rectangular in cross section, body portion 28, which has a transversely extending slot 30 extending therethrough and intermediate the ends thereof, and a pair of longitudinally extending trunnions 32 and 34 which extend from opposite ends of the body portion 28. The end portion of the trunnion 32 is externally threaded, so as to receive the locking nut 36, which serves to prevent displacement of the arbor 26 from the brackets 22, the trunnion 34 having a splined end portion 37 which extends through the other of the brackets 22 and which splined end non-rotatably receives a ratchet wheel 38 and a correspondingly internally splined crank arm 40. As is apparent, suitable sleeves 42 may be provided on each of the trunnions 32 and 34, so as to laterally space the body 28 of the arbor 26 from the mounting brackets 22. Thus, the web 44 having a reduced end portion 46 may be wound upon the arbor 26, the reduced end portion being received through the slot 30, the end thereof wrapping around the body portion 26, in a manner clearly apparent from a consideration of Figure 10 so that as the tarpaulin rolls upon the arbor, the succeeding layers will bind the reduced end 46 of the tarpaulin to the body portion 28 of the arbor 26. For this reason, it is intended that the body portion of the arbor have relatively sharp corners thereon so as to reduce the tendency of the relatively stiff tarpaulin to slide relative to the arbor, when the latter is rotated. It is believed apparent, however, that arbors having other cross-sectional configuration may be utilized without departing from the spirit of this invention.

A pawl 48 is pivotally secured to one of the mounting brackets 22 so that the nose portion thereof is selectively engageable with the teeth on the ratchet wheel 38, a pawl release finger 50 being formed integrally with the pawl 48, so as to selectively pivot the latter out of ratchet engagement.

The casing is provided to cover the web, when the latter is wound upon the roll, which casing consists of an arcuate shield 52 which extends longitudinally of the roll of web, and which casing is provided with a pair of end walls 54 and 56. In order to more efficiently encase the roll of web, and also to prevent the entrance of wind and rain between the web 44 and the upper edge of the front wall 20, it is intended that the casing 52 be secured to the front wall 20, below the upper edges thereof. However, in order to permit the roll storage device to be utilized to cover an upper deck, to be described hereinafter, which deck may be mounted upon the lower box, it is intended that the casing be hingedly connected to the front wall of the truck box, and for this purpose the lower edge of the casing 52 is provided with longitudinally spaced sleeves 58, between which sleeves are positioned the complementary knuckles 60 of a hinge plate 62 and through which sleeves and knuckles extend a hinge pin 64, whereby the casing is hingedly connected to the hinge plate 62. The hinge plate is secured, by suitable fasteners 66, to the front wall 20 of the box, below the upper edge thereof, as is best shown in Figure 10 of the drawings. A suitable hook 68 is pivotally secured to one of the brackets 22, and a cooperating eye 70 is secured to the end wall 56 of the casing, whereby the casing may be selectively locked in its roll encasing position. It is believed apparent that additional eyes or hooks may be provided so that the casing may also be locked in a position which is pivoted forwardly sufficiently to permit the web 44 to be unwound therefrom, when the latter is being used to cover an upper deck 72, of conventional structure, which is positioned on the truck box 12. It will thus be seen that the web winding arbor 26 which is positioned forwardly of the front wall 20 will not interfere with the placement of the upper deck 72 upon the truck box 12, it being merely necessary to provide a pair of apertures 74' in the lower forward edge of the upper deck 72, through which the brackets 22 will extend. It will additionally be seen, from a consideration of Figures 2 and 11, that the same web storing arbor may be utilized to cover the upper deck 72, when the latter is positioned upon the truck box 12, it being merely necessary to pivot the casing forwardly sufficiently to permit the web 44 to be drawn up over the front of the upper deck, in a manner which is believed readily apparent from a consideration of the accompanying drawings. It will thus be noted that even when the casing is pivoted forwardly to permit the web to be drawn over the upper deck, the casing will restrict the entrance of wind and rain between the casing and the truck box 12, in addition to the casing serving the function of protecting the unwound portion of the web 44.

It is intended that the width of the web 44 be greater than that of the truck box 12, so that the side portions of the web or tarpaulin will overlie the side walls 18 of the truck box, or if the upper deck 72 is positioned thereon, it is intended that the side portions overlie the side walls of the upper deck. Suitable grommets 74 are disposed about the periphery of the tarpaulin 44, the grommets along the sides of the tarpaulin receiving one end of the springs 76, which springs are otherwise terminally attached to eye bolts 78 disposed about the edges of the truck box platform 16. It is thought readily apparent that the length of the springs 76, which will necessarily be utilized when the upper deck 72 is positioned on the truck box 12, will be of a greater length than would be required if the tarpaulin 44 were utilized to cover only the lower truck box 12. An alternative construction would be to position a second set of eyes (not shown) about the upper edge of the truck box 12, the second set being vertically spaced from the first set of eyes 78 a distance equal to the height of the upper deck 72, thereby permitting use of springs 76 of the same length as would be required in securing the sides of the tarpaulin 44, when the latter is utilized to merely cover the truck box 12.

It is intended that the rear wall 80, of the truck box 12, be provided with downwardly opening hooks, 82, which are longitudinally spaced upon the rear wall a distance substantially equal to the spacing of the grommets 78 along the rear edge of the tarpaulin, the hooks 82 extending through the grommets.

In operation, when the upper deck 72 is not positioned upon the truck box 12, and it is desired to cover the truck box in the manner shown in Figures 1, 4, 5, 10 and 12, the web 44 is unrolled from the arbor 26, the grommets 78 along the rear edges thereof then being secured to the hooks 82 and the arbor rotated by means of the crank 40 to tension the tarpaulin between the hooked rear end and the arbor, the pawl and ratchet 38 and 48 locking the tarpaulin in its tensioned condition. The springs 76 are then terminally secured to the gormmets 74 on the side portions of the tarpaulin, and also to the eye bolts 78, whereby the tarpaulin will be firmly retained upon the truck box 12. As is apparent from a consideration of the drawings referred to above, the casing 52, when the tarpaulin is merely covering the truck box 12, will be in a position so as to encase the unrolled portion of the web 44 and also to deflect wind and rain from the space between the leading edge of the web 44 and the upper edge of the front wall 20. When rewinding the web 44 upon the roll, it is merely necessary to fold the side portions of the web upon the central portion thereof, thereby providing an effective width of the web which is substantially equal to the length of the arbor 26.

When the upper deck 72 is positioned upon the truck box 12, it is obviously necessary to pivot the casing forwardly sufficiently so that the upper edge of the casing 52 will not interfere with the positioning of the upper deck, the web 44 then being unwound from the arbor 26 and secured to the upper deck, in a manner similar to that described for securing the tarpaulin when covering the truck box 12 below.

From the foregoing, it is thought that the operation and construction of the device will be readily understood, and further discussion is therefore believed to be unnecessary. However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. In combination with a truck box having a front wall and rearwardly extending side walls, a pair of forwardly extending brackets attached to said side walls, an arbor rotatably journaled on said brackets forwardly of said front wall, a web forming a cover for said box, means detachably securing one edge of said web to said arbor, and means carried by said arbor for selectively rolling and unroling said web therefrom, a casing vertically pivotally carried by said front wall, said casing being movable into and out of arbor encasing position, and means for locking said casing in a predetermined adjusted position relative to said arbor.

2. In combination with a truck box having a front wall and rearwardly extending side walls, a pair of brackets secured to said box and extending forwardly thereof, an arbor rotatably journaled in said brackets forwardly of said front wall, a web forming a cover for said box secured to said arbor, a manually actuable crank carried by one end of said arbor for winding and unwinding said web therefrom, an elongated semi-cylindrical casing, means hingedly connecting the lower edge of said casing to said front wall with the convex side thereof extending forwardly for vertical swinging movement about an axis parallel to said arbor, end plates on said casing overlying said brackets, one of said end plates having an arcuate slot therein concentric with the axis about which said casing pivots, said slot receiving the end of said arbor which is attached to said crank, and means for locking said casing coaxially of said arbor.

RAYMOND A. NEITZKE.

REFERENCES CITED

The following references are of record in the file of this patent:

UNITED STATES PATENTS

| Number | Name | Date |
| --- | --- | --- |
| 760,367 | Ambrose | May 17, 1904 |
| 1,130,299 | Kollenborn | Mar. 2, 1915 |
| 1,255,809 | Stenson | Feb. 5, 1918 |
| 2,230,908 | Reiman | Feb. 4, 1941 |

FOREIGN PATENTS

| Number | Country | Date |
| --- | --- | --- |
| 110,940 | Great Britain | Nov. 8, 1917 |
| 180,201 | Great Britain | May 26, 1922 |
| 754,351 | France | Nov. 6, 1933 |